United States Patent
Lueth et al.

(10) Patent No.: US 8,918,532 B2
(45) Date of Patent: Dec. 23, 2014

(54) SYSTEM AND METHOD FOR CONTROLLING A PERFORMANCE ENVIRONMENT

(76) Inventors: Jacquelynn R. Lueth, Encino, CA (US); David M. Hankla, Encino, CA (US); William Garnet, Encino, CA (US); Adit Reddy, Los Angeles, CA (US)

(*) Notice: Subject to any disclaimer, the term of this patent is extended or adjusted under 35 U.S.C. 154(b) by 622 days.

(21) Appl. No.: 12/897,606

(22) Filed: Oct. 4, 2010

(65) Prior Publication Data

US 2011/0022673 A1    Jan. 27, 2011

Related U.S. Application Data

(63) Continuation-in-part of application No. 12/717,921, filed on Mar. 4, 2010.

(60) Provisional application No. 61/157,229, filed on Mar. 4, 2009.

(51) Int. Cl.
*G06F 15/16* (2006.01)
*H04L 29/06* (2006.01)

(52) U.S. Cl.
CPC ................................. *H04L 65/605* (2013.01)
USPC ............................ 709/231; 709/204; 709/206

(58) Field of Classification Search
CPC ...................................................... H04L 65/60
USPC ........................................ 709/206, 231, 204
See application file for complete search history.

(56) References Cited

U.S. PATENT DOCUMENTS

| | | | |
|---|---|---|---|
| 2005/0289622 A1* | 12/2005 | Vanlerberghe et al. | 725/100 |
| 2008/0098417 A1* | 4/2008 | Hatamian et al. | 725/24 |
| 2010/0037127 A1* | 2/2010 | Tomasic et al. | 715/224 |

OTHER PUBLICATIONS

Snyder, Steven. "Web cameras are one man's companionship; 'OurPrisoner' star goes for gold while basking in other's morbid curiosity"; Publication: Times-Picayune [New Orleans, La], Sep. 24, 2006.

* cited by examiner

*Primary Examiner* — Glenford Madamba
(74) *Attorney, Agent, or Firm* — Kirby B. Drake; Klemchuk Kubasta LLP

(57) ABSTRACT

The present disclosure generally provides a system and method for affecting a result associated with an event. The method may include receiving one or more of a first data transmission associated with a first communication protocol and combining the first data transmissions to create a first data transmission stream. The method may also include receiving one or more of a second data transmission associated with a second communication protocol and combining the second data transmissions to create a second data transmission stream. The first data transmission stream and the second data transmission stream may be combined to create a first combined data transmission stream that may be used to affect a result associated with an event.

22 Claims, 2 Drawing Sheets

SYSTEM AND METHOD FOR CONTROLLING A PERFORMANCE ENVIRONMENT

CROSS REFERENCE TO RELATED APPLICATIONS

This application is a continuation-in-part of and claims priority and the benefit under 35 U.S.C. §120 from U.S. patent application Ser. No. 12/717,921 for "Remote Audience Participation" filed on Mar. 4, 2010, which claims priority and the benefit under 35 U.S.C. §119(e) from U.S. Provisional Patent Application No. 61/157,229 for "Method and Device for Remote Audience Distraction" filed Mar. 4, 2009, both of which are hereby incorporated by reference in their entireties.

FIELD OF THE INVENTION

The disclosure relates generally to entertainment services, live or taped performances, live or taped events and/or information gathering services. In particular, the disclosure relates to systems and methods to receive multiple types of communications on which a result or outcome associated with an event may be based.

BACKGROUND

Television and, in particular, reality programming has recently become very popular. Some reality shows, game shows and other programming include audience participation in voting or judging. An audience member may place a vote by communicating with a particular telephone number and/or text code associated with a particular participant. Votes for that particular participant may be registered when calls and/or text messages are placed to the telephone number and/or text code associated with the particular participant.

SUMMARY

In an embodiment, the present disclosure could generally provide a method of affecting a result associated with an event. The method may include receiving one or more of a first data transmission associated with a first communication protocol and combining the first data transmissions to create a first data transmission stream. The method may also include receiving one or more of a second data transmission associated with a second communication protocol and combining the second data transmissions to create a second data transmission stream. The first data transmission stream and the second data transmission stream may then be combined to create a first combined data transmission stream that may be used to affect a result associated with an event. The first combined data stream may represent a tally increasing substantially in real-time.

In an embodiment, the present disclosure could generally provide an event control system. The system may include a plurality of servers, each operable to receive and combine data transmissions associated with one communication protocol to create a plurality of data transmission streams. The system may also include an aggregator operable to receive and combine the plurality of data transmission streams to create a combined data transmission stream. The combined data transmission stream may be used to affect a result associated with an event.

In an embodiment, the present disclosure could generally provide an event control system that may include an aggregator operable to combine a plurality of different data transmission types to create a combined data transmission stream, each of the different data transmission types being associated with a unique communication protocol. The combined data transmission stream may be used to affect a result associated with an event.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
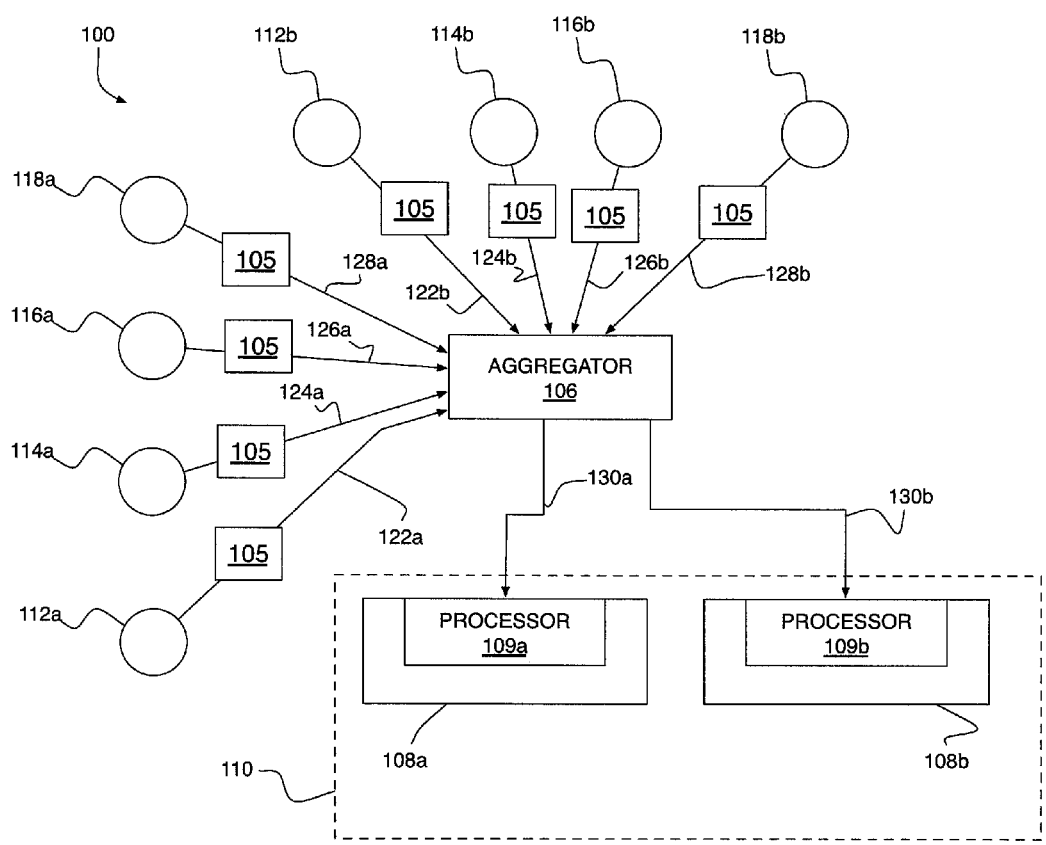
FIG. 1 is a block diagram of a system allowing communication from audience members to control a result associated with an event according to an embodiment of the present disclosure.

Embodiments of the present disclosure generally provide a system of interactive technologies to engage audience members to affect a result associated with an event.

As used herein, the term "event" is intended to convey the broadest possible meaning and refers to any happening, occurrence, appearance, ceremony, circumstance, experience, function, occasion, proceeding, situation, performance, debate, speech, election, etc. where audience members may send communications to affect a result associated with the event. By way of non-limiting example, in some embodiments, the event may be a live or taped performance for a television show, theater show, or webcast; a live or taped sporting event, concert event, or political event; or an audience poll or other type of information gathering session.

Embodiments of the present disclosure generally provide a system of interactive technologies that allow audience members to communicate input to affect the result associated with the event. By way of non-limiting example, the audience members may vote; judge; indicate an opinion; control a device used to distract, confuse, impact, instruct, command, etc. participants in an event; or otherwise positively or negatively affect a result associated with the event.

In certain embodiments, the audience may transmit data through personal communication devices that communicate using different protocols. The data transmissions from the personal communication devices may be aggregated into a single combined transmission stream or single tally. The single tally may then be used in any number of different ways to affect a result associated with an event. By way of non-limiting example, the single tally may be used to: control an electromechanical or other device located on a set where a live performance is occurring; rank the performers according to audience preference; indicate which politician is "winning" a political debate or election; provide audience member opinions in response to a polling question; increase or decrease physical, psychological or mental challenges for the performers on a game show or reality show, and the like. The number of different possible applications is unlimited, and it is contemplated that the single combined data transmission stream or single tally may be used as an input to affect any result associated with an event.

In certain embodiments, communications from the audience members may increase obstacles to disadvantage a performer, or they may eliminate or decrease obstacles to advantage the performer. For example, communications from audience members may cause a light or other similar objects to light up, blink, or strobe with varying duration, frequency or intensity; cause a sound or multiple sounds of varying volumes and pitch; cause water, ice, sand, foam, paint, smoke or any other physical impediment to increase or decrease; cause the difficulty of questions posed to a performer to increase or decrease; cause the spiciness of food in an eating contest to increase or decrease, etc.

To illustrate the teachings of the present disclosure, FIG. 1 depicts a somewhat simplified schematic of a representative system 100 to receive and process communications from audience members according to an embodiment. The audience communications may be processed substantially in real-time and used to affect a result associated with the event. It should be understood that system 100 shown in FIG. 1 is for illustrative purposes only and that any other suitable system or subsystem could be used in conjunction with or in lieu of system 100 according to one embodiment of the present disclosure.

System 100 may include an aggregator 106, an optional electromechanical device 108a that may be associated with participant "A", and an optional electromechanical device 108b that may be associated with participant "B". In certain environments, devices 108a and 108b may be embodied in a single device, or may be embodied in more than two devices. In an embodiment, any or all of these components may be on the set 110 of a live performance.

In certain embodiments, the aggregator 106 may be configured to receive data transmissions originating from a plurality of endpoints 112-118. The received data transmissions may be a "vote" for or against participant "A" or may be a "vote" for or against participant "B". A vote may be transmitted on any one of a variety of data transmission or communication protocols. For example, a vote may be a text message sent to a short code, it may be a communication with a web server, similar to a web-counter, it may be a data transmission from a Smartphone application, or it may be a data transmission or call to a traditional telephone number. The traditional telephone number may be associated with any of a public switched telephone network (PSTN), a voice over Internet Protocol network, and the like. The aggregator 106 may receive data transmissions originating from each endpoint 112-118. The data transmissions associated with a particular participant or team may be combined into a single tally associated with the particular participant or team. This combined data stream or tally may be used as an input to affect a result associated with the event. It should be understood that system 100 could include any number of suitable endpoints, aggregators, servers, processors, or electromechanical devices.

Endpoints 112-118 may be operated by users representing audience members or viewers of the event. The data transmission originating at any of the endpoints 112-118 may be transmitted through any suitable communication network, such as a PSTN, the Internet, and an intranet. Other suitable networks may include for example, a dedicated network connection, wire-line connection, wireless connection, Internet, Intranet, WiFi, LAN, WAN, mobile phone communication network, social communication network, telecommunications network, other suitable communication systems, or any combination thereof.

A user may operate endpoints 112-118 while watching the event. For example, the audience member may use any of endpoints 112-118 to send a message, vote, communication, command, encouragement, coaching advice, or distraction to the performer as desired in order to, for example, show support or provide criticism of a particular performance or viewpoint of the performer. In some embodiments, the data transmission from the user may provide instruction or otherwise influence a team sport, a team play or strategy, an individual play or strategy, increase/decrease physical intensity, increase/decrease psychological challenges, increase/decrease mental challenges, or any suitable combination thereof.

In one embodiment, the event may be a performance occurring live on the set 110. The performance may be being broadcast on television or otherwise transmitted to an audience. The performance may include participants "A" and "B". As part of the broadcast, the audience may be invited to "vote" for or against participant "A" or "B". A vote for participant "A" may correspond to an environment, situation, or circumstance associated with participant "A" being incrementally influenced or otherwise controlled by the number of "votes" received for or against participant "A". Similarly, a vote for participant "B" may correspond to an environment, situation, or circumstance associated with participant "B" being incrementally influenced or otherwise controlled by the number of "votes" received for or against participant "B".

While viewing the broadcast of the event, a user or audience member may use a communication device or endpoint 112-118 to communicate a vote. A user may use endpoint 112 to communicate using text messaging, for example. The votes may be received by one or more servers 105. In certain embodiments, servers 105 may be a bank of multiple servers. The servers 105 may generally include any server, group of servers, databases, memories, applications, software, computer programs, routines, other objects, or any combinations thereof.

The servers 105 may combine and transform the texted communication from endpoint 112 into a running, increasing number stream or increasing tally of text votes. This combined text data stream of votes may be communicated from the server 105 to the aggregator 106. The combined text data stream for or against participant "A" may be represented by text data stream 122a. Similarly, each vote texted from the endpoint 112b may be transformed by the server 105 into a running, increasing number stream of text votes for or against participant "B", which may be represented by text data stream 122b.

A text vote may be communicated from endpoint 112 to server 105 and on to the aggregator 106 using any suitable communications network. Moreover, in certain embodiments, a text vote may be communicated directly to the aggregator 106. A text message may be a short data transmission from the endpoint 112 to the aggregator 106. The aggregator 106 or the server 105 may be associated with one or more numeric strings, such as a short code or a standard telephone number. In addition, a numeric string or code may be associated with a particular participant, such as participant "A".

To reduce the time for the communication from the transmission from endpoint 112 to being received by the aggregator 106, the text message may be blank or may be comprised of a single word. In this manner, a decoding time for the server 105 or aggregator 106 to decode the message may be significantly reduced. The time on which the text may affect the result associated with the event may also be decreased because the data transmission from the endpoint 112a may be not be processed by the server 105 or aggregator 106 as a text message, but rather may be processed as a discrete "vote" to be included in a tally. In this manner, the data transfer or burst from the endpoint 112a may be tallied as an increasing data stream substantially in real-time.

An additional communication protocol, such as communication through the World Wide Web, may be used according to an embodiment of the present disclosure. Similarly to the text protocol, the event may be observed by a user with access to the Internet through the endpoint 114. The endpoint 114 may be a personal computer, laptop computer, Web enabled mobile device, or any suitable communication device with access to the Internet. As part of the broadcast, the audience may be invited to submit a website request or web "vote" for or against participant "A" or "B". A vote for or against participant "A" may correspond to an environment, situation, or circumstance associated with participant "A" being incrementally influenced or otherwise controlled by the number of "votes" received for or against participant "A". Similarly, a vote for or against participant "B" may correspond to an environment, situation, or circumstance associated with participant "B" being incrementally influenced or otherwise controlled by the number of "votes" received for or against participant "B".

The user may use endpoint 114 to communicate a website request or web vote using access to a web address or uniform resource locator (URL). Each website request or web vote communicated from the endpoint 114a for or against participant "A" may be represented by web data stream 124a. Similarly, each website request or web vote communicated from the endpoint 114b for or against participant "B" may be represented by Web data stream 124b. In certain embodiments, each website request or web vote may be received by server 105 and transformed into a running tally that is communicated to the aggregator 106.

A website request may be communicated from endpoint 114 to the aggregator 106 using any suitable communications network, such as the Internet or intranet.

A user may request a particular website, uniform resource locator (URL), or IP address associated with a particular participant, such as participant "A". The data transmission may be from the endpoint 114 through the server 105 to the aggregator 106. In certain embodiments, the data transmission may be from the endpoint 114 directly to the aggregator 106. The aggregator 106 or the server 105 may be associated with the one or more websites, URLs, or IP addresses. The user may be presented with a website displayed by endpoint 114. The website may include one or more virtual voting buttons. When a user uses his input device such as a mouse, touch screen, space bar and the like to "click" on a voting button associated with a particular participant, the website request initiated by the click may be received by the aggregator 106 or server 105.

This website request may be processed by the aggregator 106 or server 105 as a discrete "vote" to be included in a tally associated with participant "A". In this manner, the data transfer or burst from the endpoint 114a may be tallied as an increasing data stream substantially in real-time. Each click of the voting button may be processed as a discrete website request or web vote regardless of the endpoint 114.

In one embodiment, each user may submit as many website requests or web votes from the same IP address as the user desires. In an alternate embodiment, system 100 may store the IP address of the endpoint 114 and/or some other form of personal identification information. Then, if an additional website request or web vote is received from that same IP address and/or matching the stored personal identification information, a webpage indicating that a vote has already been received may be displayed on endpoint 114. In this manner, a user may be prevented from casting multiple votes from the same endpoint 114. This increasing tally may be similar to a conventional website counter or hit counter that is known in the art.

An additional communication protocol may be used according to an embodiment of the present disclosure. For example, the endpoint 116 may be a Smartphone operating a Smartphone application that has been installed on endpoint 116. The application may display one or more virtual voting buttons similar to the web protocol endpoint 114.

As part of the event, the audience may be invited to submit a Smartphone "vote" for or against participant "A" or "B". A vote for or against participant "A" may correspond to an environment, situation, or circumstance associated with participant "A" being incrementally influenced or otherwise controlled by the number of "votes" received for or against participant "A". Similarly, a vote for or against participant "B" may correspond to an environment, situation, or circumstance associated with participant "B" being incrementally influenced or otherwise controlled by the number of "votes" received for or against participant "B".

The user may use endpoint 116 to communicate a Smartphone vote. The vote may be communicated using a communication protocol similar to the text protocol described above with respect to the endpoint 112. In other embodiments, the vote from the endpoint 116 may be communicated using access to a web address as described above with respect to the endpoint 114. Each vote communicated from the endpoint 116a for or against participant "A" may be received by the server 105 and transformed into a running, increasing number or tally represented by Smartphone data stream 126a. Similarly, each vote communicated from the endpoint 116b for or against participant "B" may be received by the server 105 and transformed into a running, increasing number or tally represented by Smartphone data stream 126b.

Similar to the web and text protocols, a numeric string, code, or website address may be associated with a particular participant, such as participant "A". The data transmission from the endpoint 116a may be processed by the aggregator 106 or server as a text message or a website request and computed by the aggregator 106 or server 105 as a discrete "vote" to be included in a tally. In this manner, the data transfer or burst from the endpoint 116a may be tallied as an increasing data stream in nearly real-time.

An additional communication protocol may be accommodated by the system 100. For example, one additional communication protocol may be the standard telephone service that has traditionally been used to transfer voice communications. In this embodiment, a standard telephone number may be associated with a particular participant. A user may use endpoint 118 to communicate with a traditional telephone call to a traditional telephone number. Each call from the endpoint 118a may be recorded as a vote for or against participant "A". These calls may be received by the server 105. The server 105 may be operable to digitally process each received call as a vote and transform these calls into a running data stream or tally represented by call stream 128a. Similarly, the server 105 may be operable to digitally process each received call from the endpoint 118b as a vote and transform these calls into a running data stream or tally for or against participant "B" represented by call stream 128b.

In certain embodiments, calls may be digitally processed directly by the aggregator 106 as a discrete "vote" to be included in a tally. In this manner, the call from the endpoint 118a may be tallied as an increasing data stream substantially in real-time.

The present disclosure contemplates that any number of additional communications protocols may be accommodated by the system 100 beyond those specifically described above, including technologies not listed above, later-developed communication technologies, etc.

In certain embodiments, the aggregator 106 may receive each of the data streams 122-126 and the call streams 128. The aggregator 106 may generally include any server, group of servers, databases, memories, applications, software, computer programs, routines, other objects, or any combinations thereof. The aggregator 106 may combine each of the streams 122a-128a into a combined data stream 130a that represents a continuously increasing tally for or against participant "A". Similarly, the aggregator may combine each of the streams 122b-128b into a combined data stream 130b that represents a continuously increasing tally for or against participant "B".

The combined data stream 130a may be received by a processor 109a. In an embodiment, the processor 109a may be associated with a device 108a. The processor 109a may be embedded within device 108a or may be a component of a computer system in communication with device 108a. The processor 109a may process the combined data stream 130a such that the device 108a is at least partially controlled by the combined data stream 130a. For example, the device 108a may be a temperature control of a room on the set 110. The event participant "A" may be in the room. As the processor 109a receives increasing votes represented by the combined data stream 130a, the temperature in the room may increase or decrease. In other examples, the device 108a may be a noise generation device, a light generation device, a smoke/fog generation device or any other device that may be suitable to change the physical environment of participant "A". Other embodiments that are suitable to control the environment, circumstances, or situation occurring on the set 110 concerning the participant "A" may be used consistent with the teachings of the present disclosure. For example, device 108a may be a counter or indicator that prompts a host of the performance to increase/decrease the difficulty of questions posed to the participant "A", allows the participant "A" to skip a challenge, and the like.

Similarly, the combined data streams 130b may be received by a processor 109b. The processor 109b may be associated with a device 108b. The processor 109b may process the combined data stream 130b such that the device 108b is at least partially controlled by the combined data stream 130b.

In other embodiments, the processors 109a and 109b may be associated with a single device 108 that is at least partially controlled by the combined data stream 130a and the combined data stream 130b.

Figure 2:
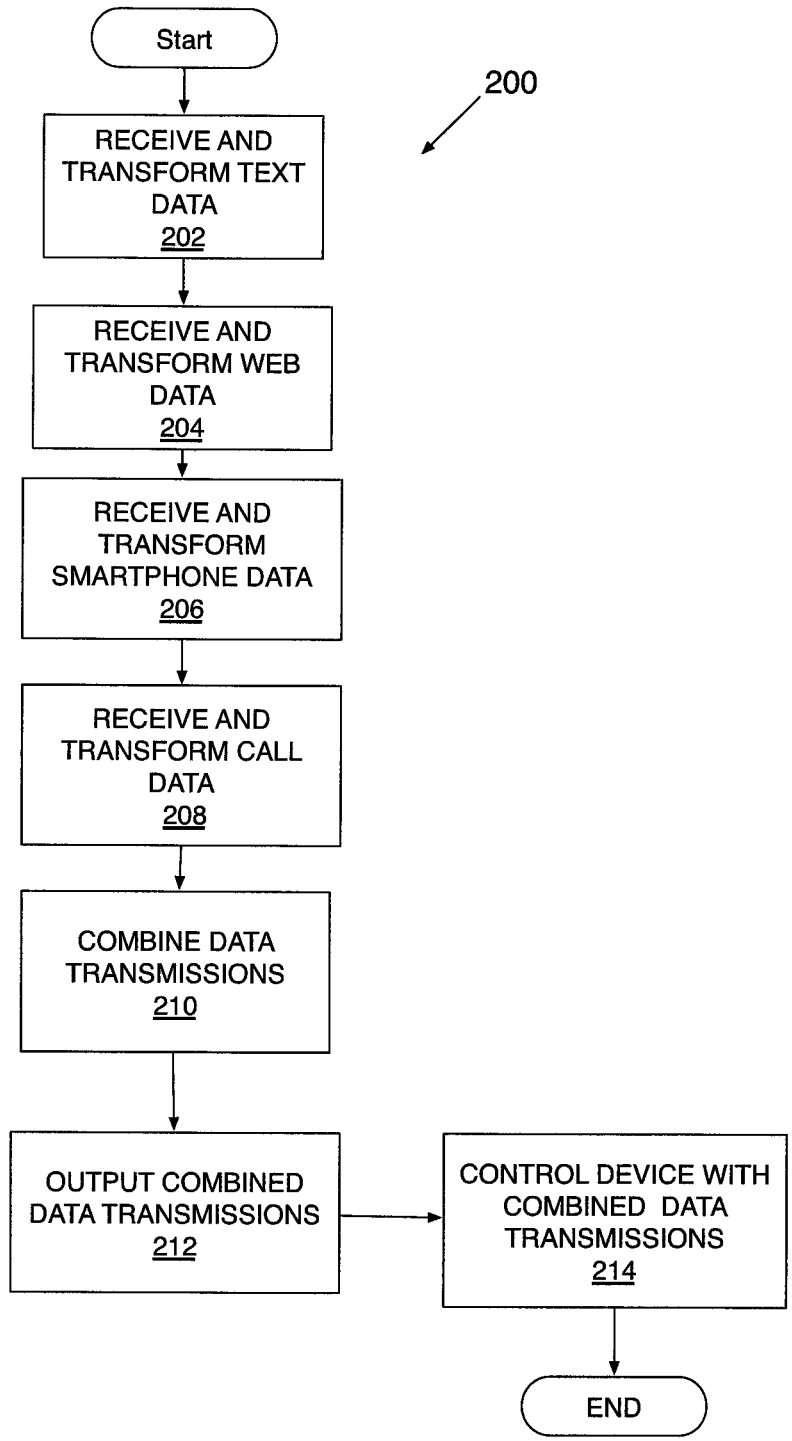
FIG. 2 is a flow diagram of a method for aggregating data streams and using the combined data stream to control a result associated with an event according to an embodiment of the present disclosure.

FIG. 2 illustrates a flow diagram of a method 200 for aggregating data transmissions or streams and using the combined data stream to control an electromechanical device in real-time. In a certain embodiment, some or all of the components represented in FIG. 1 may be employed in connection with this method. The method begins at steps 202-208 where data streams are received and transformed. The data streams may represent "votes" for a particular event participant. The data stream may be a collection of data transmissions using a particular communications protocol. At step 202, a text data stream may be received and transformed. A web data stream may be received and transformed at step 204. At step 206, a Smartphone data stream may be received and transformed, and at step 208 a call stream may be received and transformed. In certain embodiments, the transformation of the discrete votes communicated from the endpoints associated with the users may be accomplished by a processor or server, or a bank of data processors or servers, which may transform each communicated vote into a running, increasing number stream or increasing tally of votes for the respective communication protocol. Each of steps 202-208 may be carried out simultaneously.

Each of the streams received in steps 202-208 may be combined into a single combined data stream at step 210. An aggregator may be used to combine the separate data streams and create the combined data stream. A combined data stream may be communicated from the aggregator as an output in step 212. The combined data stream may represent a collection of votes received through different communication protocols for a particular event participant. At step 214, an electromechanical device associated with a particular participant may be controlled based at least partially on the combined data stream. For example, as the tally represented by the combined data stream increases, the temperature in a room where participant "A" is located may increase or decrease. Other devices may include lights, strobe lighting, digital display, lighted board, text board, digital display, computer, screen, cell phone, television, projector, speakers, water container, balloons, fireworks, fire, smoke, temperature controller, CD player, DVD player, other systems for distraction or physical change, and/or any combination thereof.

Some of the steps illustrated in FIG. 2 may be combined, modified, or deleted where appropriate, and additional steps may also be added to the flow diagram. Additionally, steps may be performed in any suitable order without departing from the scope of the disclosure.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations, and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure and the following claims.

What is claimed is:

1. A method of affecting at least one participant in a live event in real time, comprising:
   receiving one or more of a first data transmission associated with a first communication protocol;
   combining the one or more first data transmissions to create a first data transmission Stream;
   receiving one or more of a second data transmission associated with a second communication protocol;
   combining the one or more second data transmissions to create a second data transmission stream;
   combining the first data transmission stream and the second data transmission stream to create a first combined data transmission stream; and
   wherein the first combined data transmission stream controls an electromechanical device associated with the at least one participant to impact the participant's performance during the live event without controlling the result of the live event.

2. A live event control system, comprising:
a first server operable to receive and combine one or more first data transmissions associated with a first communication protocol to create a first data transmission stream;
a second server operable to receive and combine one or more second data transmissions associated with a second communication protocol to create as second data transmission stream; and
an aggregator operable to receive and combine the first data transmission stream and the second data transmission stream to create a first combined data transmission stream;
wherein the first combined data transmission stream controls an electromechanical device associated with at least one participant during the live event to cause one or more of the following without controlling the result of the live event:
increase obstacles to negatively impact or disadvantage the at least one participant;
intensify distractions to negatively impact or disadvantage the at least one participant; and
increase the difficulty level related to the live event to negatively impact or disadvantage the at least one participant.

3. The system of claim 2, wherein:
the one or more first data transmissions associated with the first communication protocol are one or more first text message communications; and the one or more second data transmissions associated with the second communication protocol are one or more first website requests.

4. The system of claim 3, wherein:
the one or more first text message communications are addressed to a first code associated with a first participant; and the one or more first website requests are addressed to a first uniform resource locator (URL) associated with the first participant.

5. The system of claim 4, further comprising:
a third server operable to receive and combine one or more of a second text message communication addressed to a second code associated with a second participant to create a third data transmission stream; and
a fourth processor operable to receive and combine one or more of a second website request addressed to a second URL associated with the second participant to create a fourth data transmission stream;
wherein the aggregator is operable to combine the third data transmission stream and the fourth data transmission stream to create a second combined data transmission stream; and
wherein the second combined data transmission stream controls an electromechanical device associated with at least one participant to impact the participant's performance during the live event, without controlling the result of the live event.

6. The system of claim 3, further comprising:
a third server operable to receive and combine one or more of a call addressed to a telephone number to create a third data transmission stream; and
wherein the aggregator is operable to combine the first data transmission stream, the second data transmission stream and the third data transmission stream to create the first combined data transmission stream.

7. The system of claim 6, further comprising:
a fourth processor operable to receive and combine one or more of a Smartphone communication addressed to a first code to create a fourth data transmission stream; and
wherein the aggregator is operable to combine the first data transmission stream, the second data transmission stream, the third data transmission stream and the fourth data transmission stream to create the first combined data transmission stream.

8. The system of claim 2, wherein the first combined data transmission stream represents a tally associated with a first participant, the tally increasing substantially in real-time.

9. A live event participant control system comprising:
an aggregator operable to combine a plurality of different first data transmission types to create a first combined data transmission stream, each of the first different data transmission types being associated with a unique communication protocol; and
wherein the first combined data transmission stream controls an electromechanical device associated with at least one participant during the live event to cause one or more of the following without controlling the result of the live event:
eliminate or decrease obstacles to positively impact or advantage the at least one participant;
diminish distractions to positively impact or advantage the at least one participant;
decrease the difficulty level related to the live event to positively impact or advantage the at least one participant.

10. The system of claim 9, wherein the first different data transmission types comprise two or more of text message communications, website requests, Smartphone communications, and calls.

11. The system of claim 9, wherein the first combined data stream represents a first tally increasing substantially in real-time.

12. The system of claim 9, wherein: the aggregator is further operable to combine a plurality of different second data transmission types to create a second combined data transmission stream, each of the second different data transmission types being associated with a unique communication protocol; and wherein the second combined data transmission stream controls an electromechanical device associated with at least one participant to impact the participant's performance during the live event, without controlling the result of the live event.

13. The system of claim 12, wherein the second different data transmission types comprise two or more of text message communications, website requests, Smartphone communications, and calls.

14. The system of claim 12:
wherein the first combined data transmission stream represents a first tally associated with a first participant, the first tally increasing substantially in real-time; and wherein the second combined data transmission stream represents a second tally associated with a second participant, the second tally increasing substantially in real-time.

15. The method of claim 1, wherein the electromechanical device negatively impacts the participant's performance during the live event.

16. The method of claim 15, wherein the electromechanical device negatively impacts the participant's performance during the live event by increasing obstacles to disadvantage the at least one participant.

17. The method of claim 15, wherein the electromechanical device negatively impacts the participant's performance during the live event by intensifying distractions to disadvantage the at least one participant.

18. The method of claim 15, wherein the electromechanical device negatively impacts the participant's performance during the live event by increasing the difficulty level related to the live event to disadvantage the at least one participant.

19. The method of claim 1, wherein the electromechanical device positively impacts the participant's performance during the live event.

20. The method of claim 19, wherein the electromechanical device positively impacts the participant's performance during the live event by eliminating or decreasing obstacles to advantage the at least one participant.

21. The method of claim 19, wherein the electromechanical device positively impacts the participant's performance during the live event by diminishing distractions to advantage the at least one participant.

22. The method of claim 19, wherein the electromechanical device positively impacts the participant's performance during the live event by decreasing the difficulty level related to the live event, to advantage the at least one participant.

* * * * *